United States Patent [19]

Kleppner et al.

[11] Patent Number: 5,797,373

[45] Date of Patent: Aug. 25, 1998

[54] FUEL FEEDING DEVICE OF MOTOR VEHICLE

[75] Inventors: Stefan Kleppner, Bretten; Willi Strohl, Beilstein, both of Germany

[73] Assignee: Robert Bosch GmbH, Stuttgart, Germany

[21] Appl. No.: 818,700

[22] Filed: Mar. 14, 1997

[30] Foreign Application Priority Data

May 9, 1996 [DE] Germany ............... 196 18 649.8

[51] Int. Cl.$^6$ ............................................. F02M 37/04
[52] U.S. Cl. .................... 123/495; 137/574; 123/509
[58] Field of Search ........................... 123/510, 514, 123/445, 509; 137/574

[56] References Cited

U.S. PATENT DOCUMENTS

| | | | |
|---|---|---|---|
| 5,029,611 | 7/1991 | Sasaki | 123/514 |
| 5,111,844 | 5/1992 | Emmert et al. | 123/514 |
| 5,133,324 | 7/1992 | Michiaki | 123/514 |
| 5,170,764 | 12/1992 | Tuckey | 123/509 |
| 5,218,942 | 6/1993 | Coha et al. | 123/514 |
| 5,396,872 | 3/1995 | Ruger et al. | 137/574 |

FOREIGN PATENT DOCUMENTS 3612194 10/1986 Germany.

*Primary Examiner*—Thomas N. Moulis
*Attorney, Agent, or Firm*—Michael J. Striker

[57] ABSTRACT

A fuel feeding device for a motor vehicle has a fuel container having a plurality of parts with bottoms separated from one another, a fuel feeding aggregate operating from supplying fuel from the supply container to an internal combustion engine, a fuel withdrawing unit provided in one part of the fuel container and connected with a fuel conduit so that the fuel withdrawing unit aspirate fuel from the one part of the fuel container and through the suction conduit also from at least one further part of the fuel container.

6 Claims, 3 Drawing Sheets

5,797,373

1

FUEL FEEDING DEVICE OF MOTOR VEHICLE

BACKGROUND OF THE INVENTION

The present invention relates to a fuel feeding device of a motor vehicle.

Fuel feeding devices of the above mentioned general type are known in the art. One of such fuel feeding devices for a vehicle is disclosed in the German patent document DE 36 12 194 C1. This fuel feeding device of a motor vehicle has a fuel container in which a fuel retaining device is provided. The fuel retaining device serves for making available a quantity of the fuel which is sufficient for operation of the internal combustion engine. Fuel is supplied from the fuel retaining device through a fuel conduit with a fuel feeding aggregate to the internal combustion engine. In order to guarantee that the fuel retaining device can make available always a sufficient quantity of fuel, a jet pump is arranged in the fuel container at the bottom side outside of the fuel retaining device. The jet pump has an injection nozzle connected with a fuel return conduit and a funnel arranged at a distance from it and connected with a conduit extending into the fuel retaining device. The jet pump operates by the excessive fuel which is returned in the fuel return conduit into the fuel container, so that a fuel quantity is pumped from the lower part of the fuel container into the fuel retaining device.

In such a fuel container which can be formed in two parts with a bottom separated from one another by a raised hump or saddle it is necessary to provide suction jet pump in each of these parts, so that the fuel can be transferred into the fuel retaining device or into the part of the fuel container, from which the fuel conduit takes the fuel to supply it to the internal combustion engine.

SUMMARY OF THE INVENTION

Accordingly, it is an object of the present invention to provide a fuel feeding device which avoids the disadvantages of the prior art.

In keeping with these objects and with others which will become apparent hereinafter, one feature of present invention resides, briefly stated, in a fuel feeding device of the above mention type in which a fuel withdrawing device is provided in a part of the fuel container and connected with a fuel conduit, to aspirate fuel from this part of the fuel container and through a suction conduit from at least one further part of the fuel container.

When the fuel feeding device is designed in accordance with the present invention, it has the advantage that no additional parts, such as for example a suction jet pump or a displacement pump is needed to supply a fuel quantity from the corresponding part of the fuel container so as to provide a continuously sufficient fuel quantity for the operation of the internal combustion engine in the part of the container from which the fuel conduit leads to the internal combustion engine. Thereby a cost-favorable design and a simple mounting of such a fuel feeding device is provided.

In accordance with an advantageous embodiment of the present invention, the outlet of the fuel withdrawing device is formed as a Venturi nozzle, and the supply pipe of the suction conduit from the further part of the fuel container is arranged in the narrowest section of the nozzle. Due to the Venturi effect, a negative pressure in the supply pipe and thereby in the suction conduit is provided. Thereby fuel can be aspirated from the further part of the fuel container.

2

In accordance with a further alternative embodiment of the invention, the outlet of the fuel withdrawing device is formed as a nozzle with a longitudinal axis arranged in the narrowest section of the supply pipe, to which the suction conduit from the further part of the fuel container is connectable. Thereby at the free end of the supply pipe, a negative pressure can be produced, so that the fuel can be supplied from the further part of the fuel container.

In accordance with a further advantageous embodiment of the present invention, the fuel retaining device has a supply pipe, and a suction conduit which opens into the further part of the fuel container is connectable with the supply pipe. In its outer surface at least one inlet opening for fuel is provided for withdrawing fuel from the part of the fuel container in which the fuel retaining device is arranged. A suction force in the interior of a particularly bell-shaped fuel retaining device is produced by the fuel feeding aggregate through an outlet of the fuel retaining device connected with the fuel supply conduit. Under the action of this negative pressure fuel is aspirated through the supply pipe and at least one inlet opening. A mixing region is therefore formed in the interior of the fuel withdrawing device, from which the fuel is withdrawn through the outlet of the fuel withdrawing device to the internal combustion engine. The through-flow quantity can be determined by the cross-sectional area of the supply pipe and the inlet opening or openings, so that the same quantity of fuel can be withdrawn from the corresponding parts of the fuel container. Depending on the different sizes of the part of the fuel container, the cross-sectional area can be adjusted so that a uniform withdrawal of the fuel quantity can be provided.

In accordance with a further advantageous feature of the present invention, the suction container which connects the parts of the fuel container has a branch before the fuel withdrawing device, and the branch opens into the part of the fuel container in which the fuel withdrawing device is located. Thereby a same liquid level can be provided in the parts of the fuel container. This is performed automatically after starting of the internal combustion engine, since a negative pressure is produced in the individual suction conduits. Thereby gas located in the region of the hump is aspirated into the suction conduits and because of the different pressure levels in the individual parts of the fuel container, automatically a level equalization is provided. Thereby the arrangement of a further tank level sensor in each part of the fuel container can be dispensed with, and a cost-favorable fuel feeding device which is also simpler to mount can be provided.

In accordance with still another further feature of the present invention, a check valve is provided at the free end of the branch. Thereby during feeding of fuel a fuel quantity is withdrawn not only from the part of the fuel container in which the free end of the branch is located, but also from at least one further part of the fuel container through a suction conduit.

Furthermore, in accordance with another embodiment of the present invention, the fuel withdrawing device is formed as a housing. Thereby the fuel withdrawing device with a structurally simple construction and cost-favorable manufacture is provided. A housing can be composed for example of synthetic plastic material and formed as injection molded part.

The novel features which are considered as characteristic for the present invention are set forth in particular in the appended claims. The invention itself, however, both as to its construction and its method of operation, together with

3 additional objects and advantages thereof, will be best understood from the following description of specific embodiments when read in connection with the accompanying drawings.

DESCRIPTION OF PREFERRED EMBODIMENTS

Figure 1:
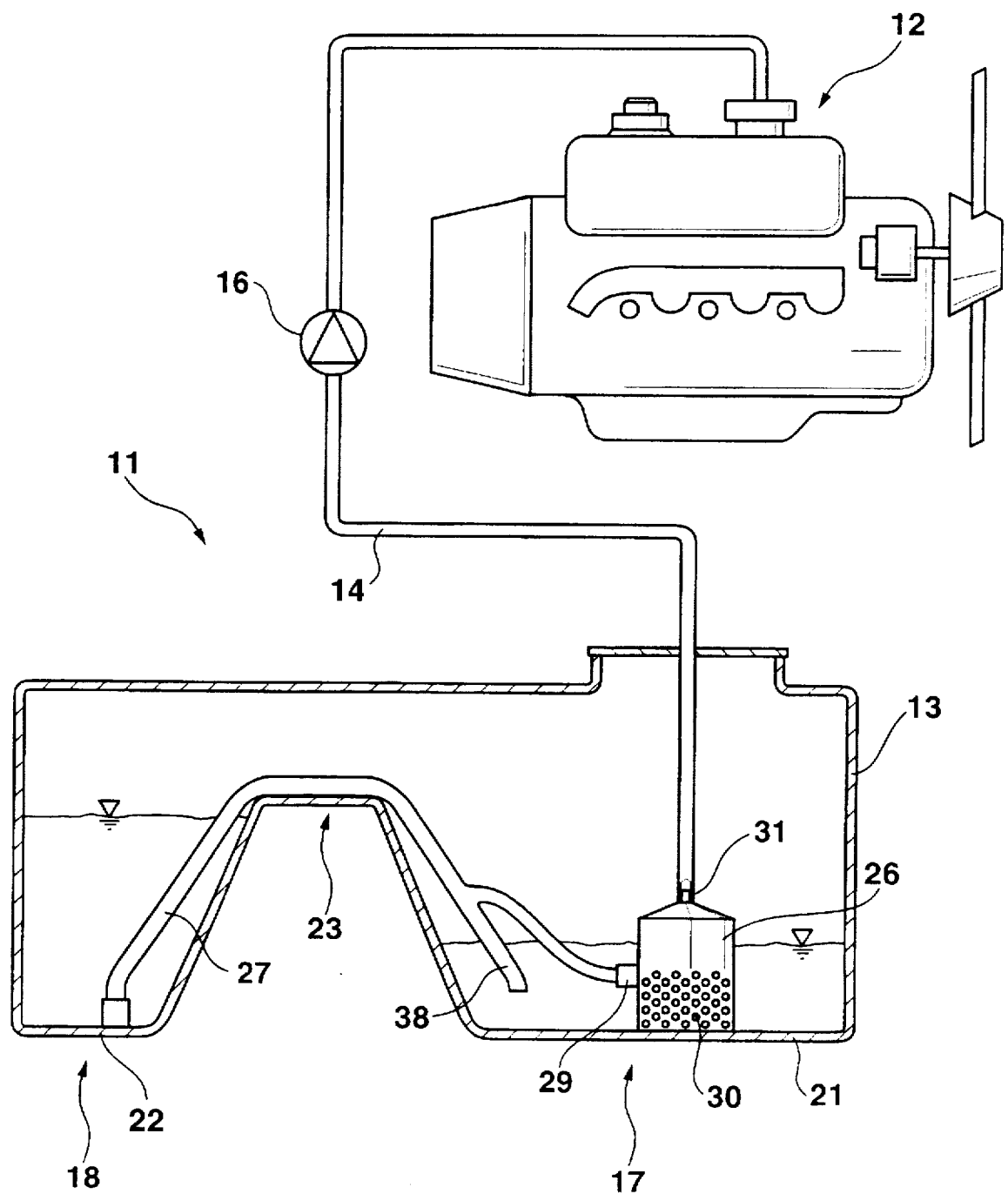
FIG. 1 is a fuel feeding device of a motor vehicle for supplying fuel from a supply container to an internal combustion engine.

A fuel feeding device in accordance with the present invention is identified as a whole with reference numeral 11 and shown in a simplified manner in FIG. 1. It operates to supply fuel to an internal combustion engine 12 of a vehicle. Fuel is supplied from a fuel container 13 through a fuel supply conduit 14 arranged in a fuel feeding aggregate 16. The fuel feeding aggregate 16 can be formed in any manner.

The fuel container 13 is partitioned and has for example two parts 17 and 18. Their bottoms 21 and 22 are separated from one another by a raised hump or saddle 23. The fuel container 13 can also have at least several parts 17, 18 whose bottoms are separated from one another by raised saddles or humps. Such fuel supply containers are utilized in motor vehicles with a small available place.

The fuel container 13 is provided with a fuel withdrawing device 26 in its part 17 at a bottom side. The fuel withdrawing device 26 is formed preferably as a housing. Openings 30 are provided in an outer surface of the housing which is formed in particular as a bell-shaped housing. The openings can be substantially great, so that the housing 26 can be formed of webs. Moreover, the outer surface of the housing 26 has a supply pipe 29. A suction conduit 27 is connectable to the supply pipe 29. Its free end is arranged in a part 18 of the fuel container 13. Thereby a fuel quantity can be withdrawn through an outlet 31 of the housing 26 from the parts 17, 18 of the fuel container 13 and supplied through the fuel supply conduit 14 to the internal combustion engine.

Figure 2:
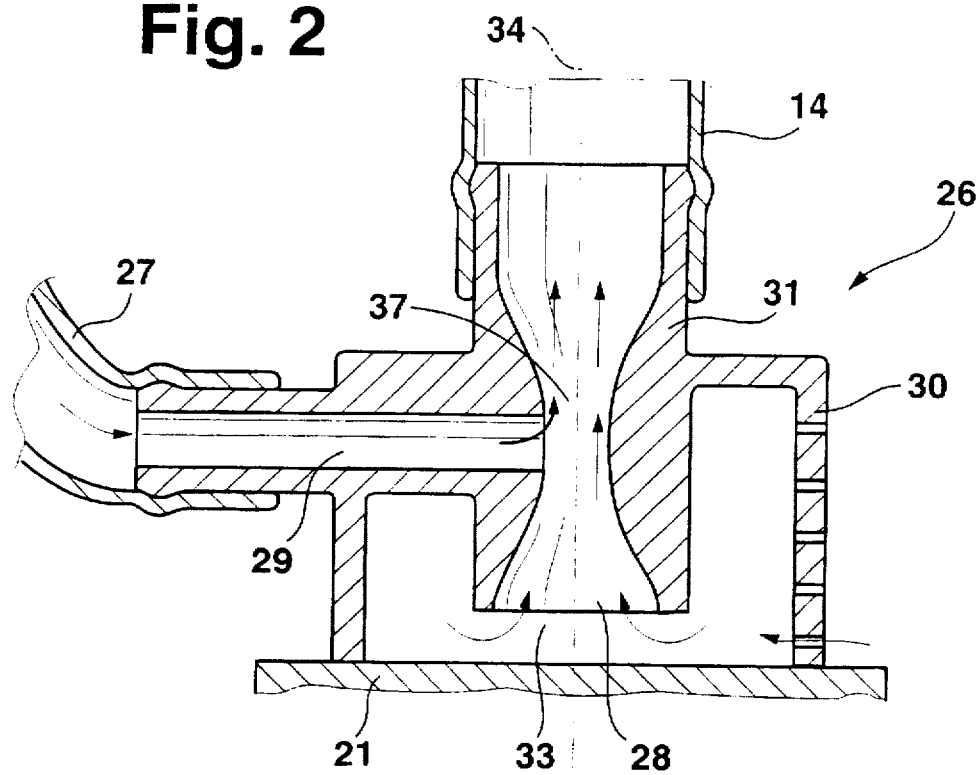
FIG. 2 is a view schematically showing a cross-section of a fuel withdrawing device in accordance with the present invention.

FIG. 2 shows a fuel withdrawing device 26. Its outlet 31 is nozzle-shaped. During the operation the supply pipe 29 is arranged in the region of the narrowest cross-section 37 and opens into it. Thereby a so-called Venturi-nozzle is formed. The fuel quantity which flows through an inlet opening 28 to the outlet 31 provides a negative pressure in the suction conduit 27 because of the Venturi effect in the narrowest section 37. Thereby fuel can be supplied from the part 18 of the fuel container 13. The fuel withdrawing device 26 can have a housing or a web for its arrangement and mounting on the bottom 21 of the fuel container 13.

Figure 3:
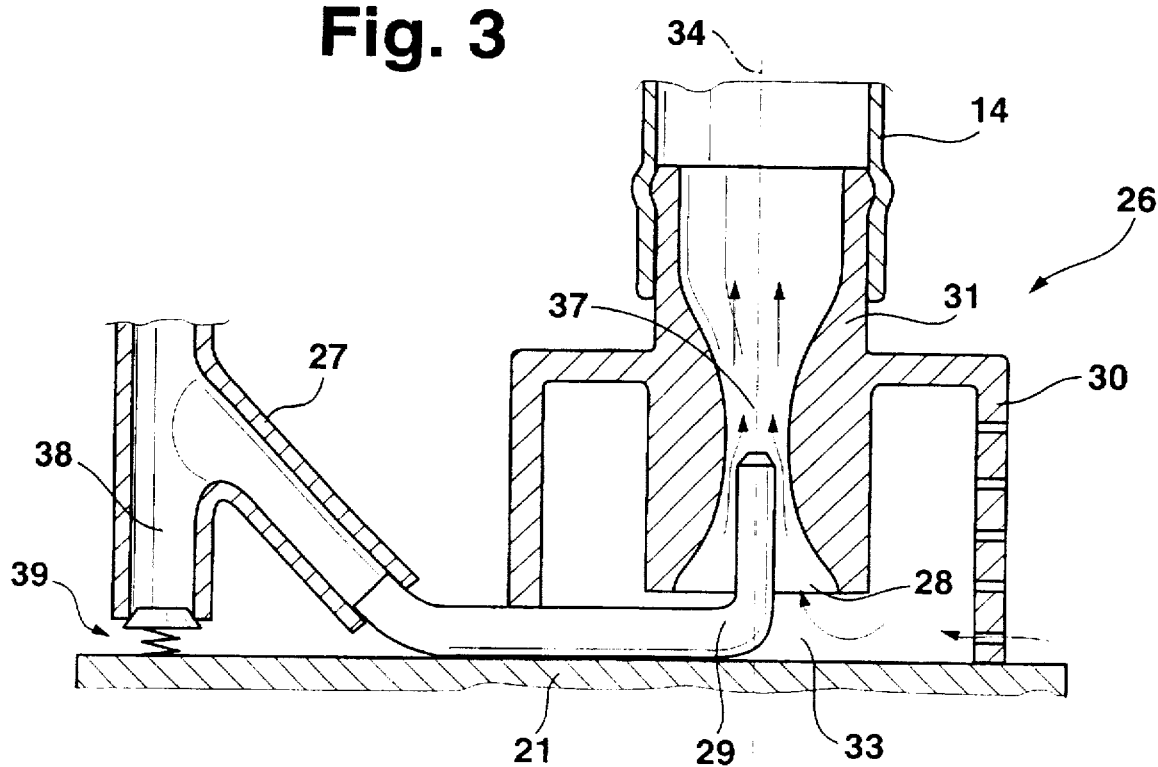
FIG. 3 is a view showing an alternative embodiment of the fuel withdrawing device in accordance with the present invention.

FIG. 3 shows an alternative suction variant. The outlet 31 is also formed as a nozzle with a narrowing cross-section 37. The supply pipe 29 is arranged with its free end in the region of the narrowest cross-section 37. The supply pipe 29 is arranged in a longitudinal axis of the outlet 31. Because of the Venturi effect, here also a negative pressure is produced in the supply pipe 29 by the fuel quantity which flows through the inlet opening 28 into the outlet 31. Thereby fuel is aspirated through the conduit 27.

The suction conduit 27 which is in communication with the supply pipe 29 can have a branch 38 with a free end arranged in the part 17 of the supply container 13. The branch 38 can be arranged between the hump 23 and the supply pipe 29. It is required that the free end of the branch 38 does not open into the part of the fuel container 13 in which the free end of the suction conduit 27 is arranged. A check valve 39 is arranged on the free end of the branch 38. Therefore during build up of a negative pressure in the suction conduit 27 the fuel quantity is withdrawn not from the part 17 of the fuel container 13, but instead from the part 18 of the fuel container 13.

Figure 4:
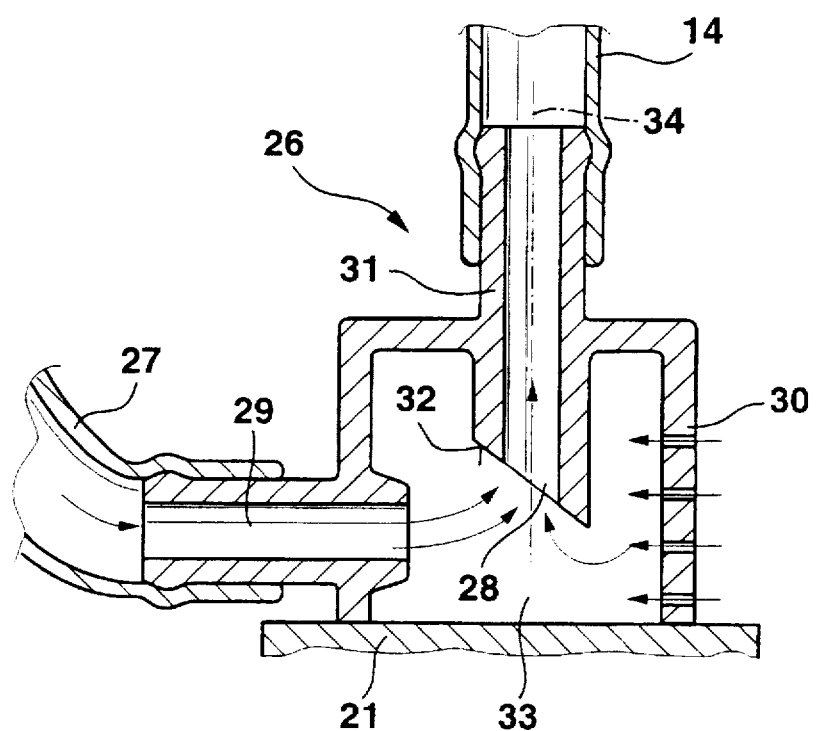
FIG. 4 is a view showing an alternative embodiment of a fuel withdrawing device of the present invention.

FIG. 4 shows a further embodiment of the fuel withdrawing device 26 in a full cross-section. This fuel withdrawing device 26 has a mixing region 33 in its interior because of the negative pressure produced in the fuel supply conduit 14, fuel flows in the mixing region 33 through the opening 38 in the supply pipe 29. The outlet 31 of the housing 26 has an end which extends into the mixing region 33. It is arranged at an angle of for example 45° relative to the longitudinal axis 34 of the outlet 31. Therefore the free end surface 32 is oriented to the supply pipe 29. As a result, during the build up of a negative pressure in the outlet 31, a greater action can be obtained onto the supply pipe 29 then onto the inlet opening 28. Therefore the negative pressure is formed for suction of the fuel quantity from the part 18 of the fuel container 13.

The fuel withdrawing device of the housing 26 operates in the following manner:

The fuel feeding aggregate 16 is turned on for operation and produces in the fuel conduit 14 a negative pressure which acts through the inlet 16 on the mixing region 33 and produces a suction force. Thereby on the one hand a fuel quantity can flow from the part 17 of the fuel container 13 and on the other hand a negative pressure is formed in the suction conduit 27 by the Venturi effect. Therefore fuel can be also withdrawn from the part 18 of the fuel container 13. Under the action of the produced negative pressure air available in the region of the hump 23 is aspirated. The fuel from the part 18 of the fuel container 13 follows the same. Thereby from the both parts 17, 18 of the fuel container 13 a fuel quantity can be withdrawn. Depending on the cross-sectional openings of the supply pipe 29 as well as or the inlet opening 28 the fuel quantity to be fed to the parts 17, 18 can be influenced.

Because of the branch 38 and the suction conduit 27 it is provided that, with a different level of the fuel in the part 17, 18, an automatic equalization can be obtained. When a negative pressure is produced in the suction conduit 27 and the level of the fuel quantity in the part 18 must be higher than in the part 17 of the fuel container 13, automatically an equalization is performed as long as the supply pipe 29 is located under the fuel surface. Because of the differently acting pressure through the different filling levels the fuel flows from the part 18 into the part 17 through the branch 38. Thereby a tank level sensor in the part 17 of the fuel container 13 can be dispensed with. Moreover, a simple mounting and construction is possible.

It will be understood that each of the elements described above, or two or more together, may also find a useful application in other types of constructions differing from the types described above.

While the invention has been illustrated and described as embodied in fuel feeding device of motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A fuel feeding device for a motor vehicle, comprising a fuel container having a plurality of parts with bottoms separated from one another; a fuel feeding aggregate operating for supplying fuel from said supply container to an internal combustion engine; fuel withdrawing means provided in one part of said fuel container and connected with a fuel conduit so that said fuel withdrawing means aspirate fuel from said one part of said fuel container and through a suction conduit also from at least another part of said fuel container which does not have said fuel withdrawing means, said fuel withdrawing means having an outlet connected with said fuel conduit and formed as a Venturi-nozzle having a narrowest section; and a supply pipe connecting said suction conduit with said fuel withdrawing means and having an outlet arranged in said narrowest section of said Venturi-nozzle.

2. A fuel feeding device as defined in claim 1, wherein said fuel withdrawing means has at least one inlet opening, said supply pipe communicates said at least one opening of said fuel withdrawing means with said suction conduit, so that through said supply pipe a fuel quantity can be supplied from said other part of said fuel container and through said at least one inlet opening a fuel quantity can be supplied from the one part of said fuel container to said fuel withdrawing means.

3. A fuel feeding device as defined in claim 1, wherein said fuel withdrawing means have an nozzle-shaped outlet communicating with said fuel conduit and having a narrowest cross-section; and further comprising a supply pipe extending from said suction conduit and arranged in said further part of said fuel container in a longitudinal action of an outlet of said fuel withdrawing means.

4. A fuel feeding device as defined in claim 1, wherein said suction conduit which connects said parts of said fuel container has a branch before said fuel withdrawing means, said branch opening into one of said parts of said fuel container in which said fuel withdrawing means is arranged.

5. A fuel feeding device as defined in claim 4, wherein said branch has a check valve which blocks flowing of a fuel quantity into said branch.

6. A fuel feeding device as defined in claim 1, wherein said fuel withdrawing means is formed as a housing.

* * * * *